(12) United States Patent
Allen

(10) Patent No.: US 9,804,945 B1
(45) Date of Patent: Oct. 31, 2017

(54) DETERMINISM FOR DISTRIBUTED APPLICATIONS

(71) Applicant: Amazon Technologies, Inc., Reno, NV (US)

(72) Inventor: Nicholas Alexander Allen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 145 days.

(21) Appl. No.: 13/733,763

(22) Filed: Jan. 3, 2013

(51) Int. Cl.
*G06F 11/00* (2006.01)
*G06F 11/36* (2006.01)

(52) U.S. Cl.
CPC .................. *G06F 11/3612* (2013.01)

(58) Field of Classification Search
CPC ............. G06F 11/3688; G06F 11/3676; G06F 11/3684; G06F 11/3636; G06F 11/3664; G06F 11/3612
USPC ........................................................ 714/38.1
See application file for complete search history.

(56) References Cited

U.S. PATENT DOCUMENTS

| | | | |
|---|---|---|---|
| 6,779,135 B1 | 8/2004 | Ur et al. | |
| 7,234,094 B2 | 6/2007 | Kadkade et al. | |
| 7,814,491 B1 * | 10/2010 | Chen | G06F 9/5016 709/226 |
| 8,572,613 B1 * | 10/2013 | Brandwine | G06F 9/45533 714/38.1 |
| 9,448,820 B1 * | 9/2016 | Allen | G06F 9/455 |
| 2002/0046393 A1 | 4/2002 | Leino et al. | |
| 2002/0174415 A1 | 11/2002 | Hines | |
| 2003/0131283 A1 * | 7/2003 | Ur et al. | 714/36 |
| 2003/0208351 A1 | 11/2003 | Hartman et al. | |
| 2006/0195606 A1 | 8/2006 | Wardwell | |
| 2006/0242464 A1 * | 10/2006 | Holt | G06F 15/16 714/25 |
| 2006/0259818 A1 * | 11/2006 | Howell | G06F 11/1484 714/21 |
| 2006/0277284 A1 * | 12/2006 | Boyd | H04L 47/10 709/223 |
| 2008/0025289 A1 | 1/2008 | Kapur et al. | |
| 2009/0144713 A1 | 6/2009 | Russell et al. | |
| 2009/0271799 A1 * | 10/2009 | Barsness et al. | 718/106 |
| 2009/0320010 A1 | 12/2009 | Chow et al. | |
| 2010/0125717 A1 * | 5/2010 | Navon | 712/30 |
| 2010/0153924 A1 | 6/2010 | Andrews | |
| 2010/0186003 A1 | 7/2010 | Shapiro et al. | |
| 2010/0275186 A1 | 10/2010 | McGarvey et al. | |

(Continued)

OTHER PUBLICATIONS

Dictionary definition of distributed, retrieved from http://www.merriam-webster.com/dictionary/distribution on May 28, 2015.*

(Continued)

*Primary Examiner* — Yair Leibovich
(74) *Attorney, Agent, or Firm* — Baker & Hostetler LLP

(57) ABSTRACT

Systems and methods are described for analyzing and verifying distributed application programs. In one embodiment, an application program is divided into as one or more independently executable components. During execution of the independently executable components, non-deterministic events are modified in order to effectuate deterministic results. The non-deterministic events may be modified in accordance with a predetermined set of constraints.

27 Claims, 9 Drawing Sheets

(56) References Cited

U.S. PATENT DOCUMENTS

| | | |
|---|---|---|
| 2010/0275260 A1 | 10/2010 | Bergheaud et al. |
| 2011/0126207 A1 | 5/2011 | Wipfel et al. |
| 2011/0145643 A1 | 6/2011 | Kumar et al. |
| 2011/0145653 A1 | 6/2011 | Broadfoot et al. |
| 2011/0283262 A1 | 11/2011 | Ceze et al. |
| 2012/0059997 A1 | 3/2012 | Cho et al. |
| 2012/0102470 A1 | 4/2012 | Yang et al. |
| 2012/0246662 A1 | 9/2012 | Vechev et al. |
| 2014/0317129 A1 | 10/2014 | Metzger |

OTHER PUBLICATIONS

Definition of distributed software, retrieved from http://en.wikipedia.org/wiki/Distributed_computing#CITEREFGodfrey2002 on May 28, 2015.*
Wikipedia "Container" and "Class" pages, retrieved using the Way backMachine from date Jun. 21, 2012 and Jun. 24, 2012, retrieved from: https://web.archive.org/web/20120621185712/https://en.wikipedia.org/wiki/Class_(computer_science).*
U.S. Appl. No. 13/733,731, filed Jan. 3, 2013, Allen.
U.S. Appl. No. 13/733,780, filed Jan. 3, 2013, Allen.
Anand et al.; "Packet Caches on Routers: The Implications of Universal Redundant Traffic Elimination"; Proceedings of the ACM SIGCOMM; 2008; 17 pages.

* cited by examiner

DETERMINISM FOR DISTRIBUTED APPLICATIONS

BACKGROUND

A data center is one example of a computing environment that houses computer systems, various networking, storage and other related components. The computing resources provided by a data center may include various types of resources, such as data processing resources, data storage resources, data communication resources and the like. To facilitate increased utilization of data center resources, virtualization technologies may allow a single physical computing machine to host one or more instances of virtual machines (VMs) that appear and operate as independent computer machines to a remotely connected computer user. Such complex computing environments allow for use of distributed services and scalable applications. However, it is increasingly difficult to analyze and verify operation of distributed applications in such environments.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

The following detailed description is directed to technologies for verification and analysis tasks in a distributed computing environment. In the examples described herein, a data center is one example computing environment in which the described embodiments can be implemented. Furthermore, a distributed program is one example of an application for the described embodiments. However, the described concepts can apply generally to other computing environments and software.

Determinism, wherein program execution has a repeatable and well-defined sequence of causes and effects, can be difficult or impossible to achieve in a complex and distributed computing environment such as a data center. For example, the computing and network settings in a data center can be vast and diverse. Because of the sheer number and variety of computing resources in a data center, it can be difficult to test and verify software and hardware in such a setting, let alone characterize the environment with respect to specific performance metrics. It can also be difficult to automate and manage the testing in a production capacity. Rigorous verification by examining many or all code paths of a distributed application can be infeasible. Even techniques such as whitebox fuzzing may be infeasible given the enormous numbers of program code flow variations.

In one embodiment, the present disclosure describes a deterministic container model that simplifies the detection and handling of non-determinism for distributed services. A program can be divided into a plurality of potentially nondeterministic execution spaces, which may be referred to as containers. Each container may operate independently on a portion of the program. Relationships between the execution spaces may be defined by the container model, and determinism may be enforced between containers.

In another embodiment, the present disclosure describes methods for providing constraint analysis using a virtualized version of a distributed application. Application message passing may be encapsulated using an envelope format that includes application data and condition variables for program analysis. Redundantly derived message exchanges may be collapsed into a single exchange using combinations of the condition variables.

In another embodiment, the present disclosure describes the use of virtualized program execution to prune the number of program code flow variations resulting from non-determinism and message passing. A program may be divided into multiple program execution units. Each execution unit may execute inside a virtual environment that permits adjustment of the program determinism. Symbolic evaluation of the execution units may be performed to generate test inputs for the program. Redundant or non-productive portions of the input space may be pruned by collapsing messaging interactions between the execution units and dynamically adjusting the determinism of program execution.

Figure 1:
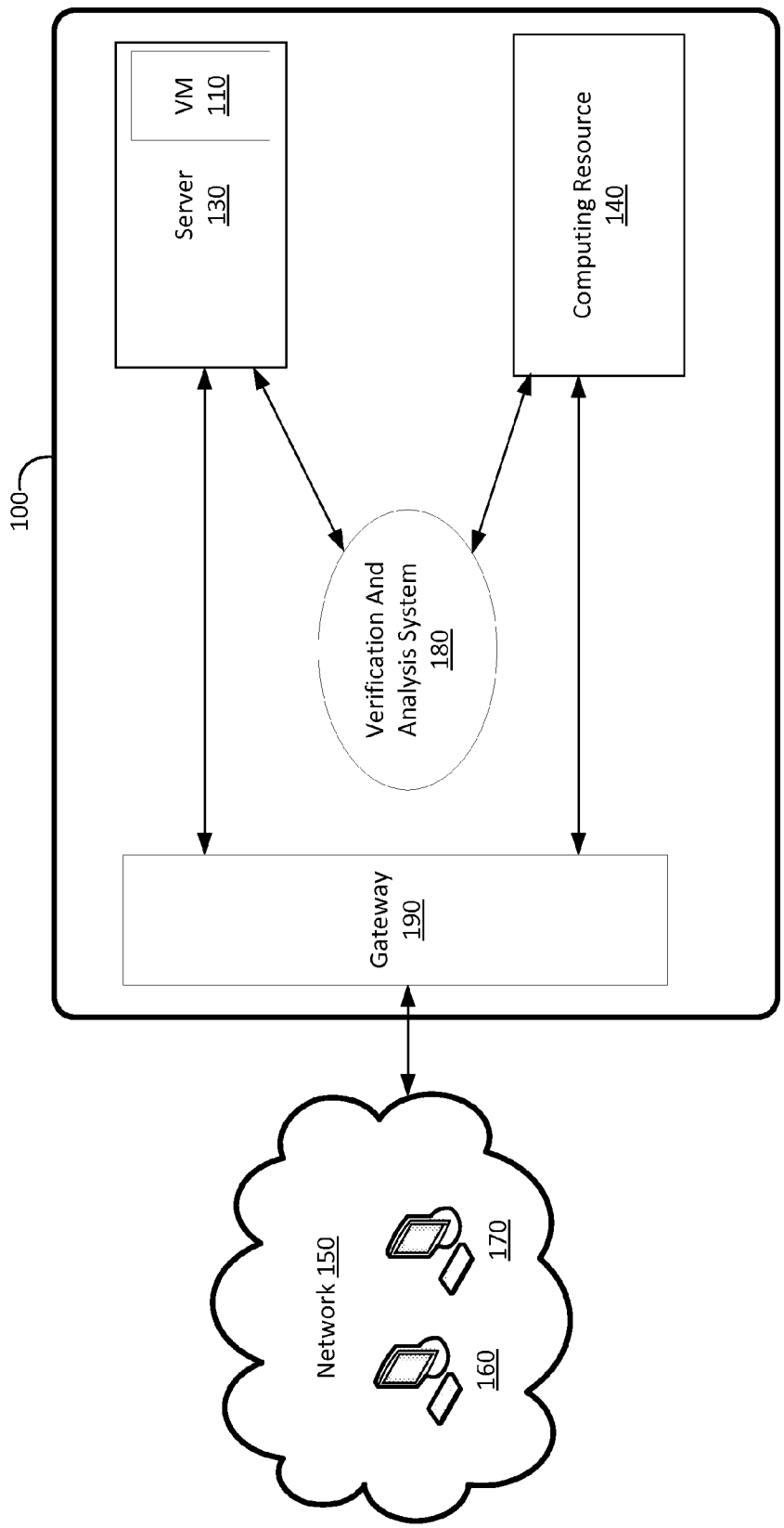
FIG. 1 is a diagram illustrating a mechanism for providing a verification and analysis system in accordance with the present disclosure.

FIG. 1 is a diagram illustrating a computing environment 100 including a mechanism for providing verification and analysis tasks in a distributed computing environment in accordance with the present disclosure. In the present disclosure, a verification and analysis system may variously be referred to as a constraint verification system or a determinism enforcement system. One embodiment that implements one or more aspects of a verification and analysis system may be a whitebox fuzzer system. Referring to FIG. 1, computing environment 100 may include a virtual machine instance 110 that may execute, for example, on a server computer 130. It will be appreciated that some embodiments may involve additional virtual machine instances that may be instantiated on additional server computers in computing environment 100. Computing environment 100 may also include a computing resource 140 that may be, for example, a storage device or another computing device.

FIG. 1 also illustrates a public network 150 that may include one or more computing devices such as computers 160 and 170. According to one embodiment, virtual machine instance 110 may be configured to provide computing services to a computer user (not shown) of public network 150 via a gateway 190 and computers 160 and 170. For example, virtual machine instance 110 may provide a set of remote access enterprise applications to a group of users who may, for example, be employees of an enterprise customer.

A user, administrator, service or any computing resource in computing environment 100 may send a request to verification and analysis system 180 for verification of a particular computing property of a distributed software application. As another example, the request may indicate that a computing device will be upgraded and that distributed software applications will be affected by the upgrade. In one embodiment, verification and analysis system 180 may divide the distributed software application into a plurality of execution spaces. Each execution space may operate independently on a portion of the distributed software application. Relationships between the execution spaces may be defined by a container model that enforces constraints on determinism between execution spaces. Verification and analysis system 180 may also perform constraint analysis against a virtualized version of a distributed application. Verification and analysis system 180 may encapsulate application messages and collapse redundantly derived message exchanges into a single exchange. Furthermore, symbolic evaluation of the execution spaces may be performed to generate test inputs for the distributed software application. Services provided by verification and analysis system 180 may be requested directly by a customer of the data center, by an administrator of the data center, a service or any computing resource within the data center such as server 130. Server 130 may also send a request on behalf of itself or on behalf of other servers.

Verification and analysis system 180 may also access information regarding available computing devices for analysis and verification. The analysis and verification may be prioritized based on factors such as cost and policy information. Verification and analysis system 180 may access information describing test parameters and performance metrics or benchmarks, analysis results and resource schedules. Verification and analysis system 180 may also access previously conducted analysis results and resource schedules. Verification and analysis system 180 may send information regarding the results to the requestor.

Figure 2:
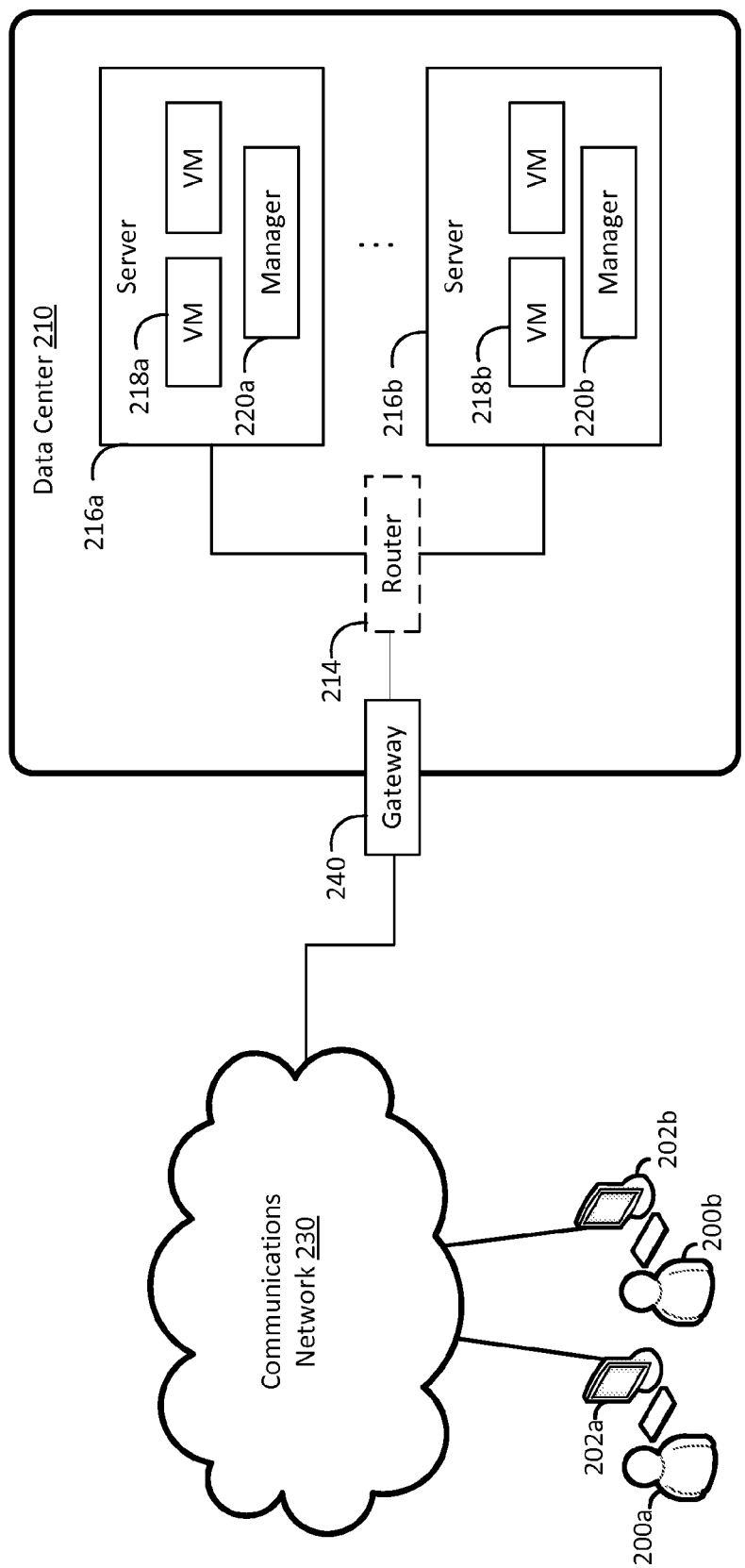
FIG. 2 illustrates an example computer system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may, for example, correspond to computing environment 100 in FIG. 1.

Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources—consisting of many processor cores, large amounts of memory and/or large storage capacity—and small resources—consisting of fewer processor cores, smaller amounts of memory and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218 and 218b (which may be referred herein singularly as "a virtual machine instance 218" or in the plural as "the virtual machine instances 218"). The virtual machine instances 218 may be configured to execute applications, including Web servers, application servers, media servers, database servers and the like. Other resources that may be provided include data storage resources (not shown), and may include hard drives, solid state storage drives or other storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other users of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220*a* or 220*b* (which may be referred herein singularly as "an instance manager 220" or in the plural as "the instance managers 220") capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216*a* and 216*b*. Router 214 may also be connected to gateway 240, which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances and other types of information. The deployment component utilizes the customer-provided configuration to launch and configure customer workloads on computing resources.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

In a distributed computing environment, it is desirable to test computing configurations by iterating through various settings in a controlled way to determine optimal test settings for a particular computing configuration and software application. When new hardware and software configurations are added to an environment such as a data center, for example, fleet fragmentation can result and the overall ability of the computing environment to meet performance goals and manage capacity can be compromised. By thoroughly testing hardware and software configurations, it is possible to achieve greater integration of the computing configuration into the computing environment's products and services. And by testing a variety of configurations, a given set of hardware and software may be determined to be able to support a number of computing services. Pools or groupings of computing resources can be identified based on such capabilities and maintained based on frequently used settings and configurations.

When a customer requests verification and/or analysis of a particular software application, a service in the data center such as verification and analysis system 180 of FIG. 1 that is implemented in one or more computing devices may be invoked. Verification and analysis system 180 may, in conjunction with other services, be configured to determine suitable computing resources that can potentially accommodate the verification and analysis, initiate a workflow to perform the verification and analysis, and report the results to the customer. The results may also be made available to other customers who may request similar tasks.

In various embodiments, a verification and analysis system such as verification and analysis system 180 of FIG. 1 may be implemented in one or more computing devices and configured to receive requests to verify and/or analyze a software application. Verification and analysis system 180 can be implemented across several computing devices or on one computing device.

Verification and analysis system 180 may create workflows to perform the verification and analysis tasks on specific resources (i.e., servers). Verification and analysis system 180 may also be configured to optimize the placement of verification and analysis tasks based on various factors such as minimization of disruption to existing services.

In some embodiments, verification and analysis system 180 may be configured to interact with other computing environment services such as a fleet management service and a configuration management service to provide the above described capabilities. For example, when a request for a verification and analysis task is received, the configuration management service can identify one or more servers available for performing the verification and analysis task. Verification and analysis system 180 may perform the verification and analysis task and utilize the available servers to instantiate virtual machines and other resources.

In some embodiments, verification and analysis system 180 may be configured to include an expert system and a knowledge base to provide a decision-making capability regarding the verification and analysis tasks. The expert system can consider benchmarks or metrics such as system throughput, processor utilization and network bandwidth. Furthermore, verification and analysis system 180 may employ one or more fitness functions to determine how close a given input is to achieving one or more verification objectives. The fitness function may be used to perform permutation testing and determine optimal test inputs. In one embodiment, functions such as a genetic algorithm may be used as a search heuristic to efficiently execute searches for satisfactory test inputs.

When a change is implemented in a computing environment such as data center 210, it is desirable to analyze affected software applications and perform one or more tests to verify that the change provides the functionality associated with the change and that the computing environment otherwise continues to function as expected and meets predetermined metrics or benchmarks. Changes that may be analyzed and tested can include, for example, hardware or software changes, firmware changes or changes in a configuration or arrangement such as a change in the network topology. It can be appreciated that analysis and testing may be desirable in response to any number of changes within or outside the computing environment. The principles described herein are applicable to any situation where analysis and testing in a computing environment is desirable.

Figure 3:
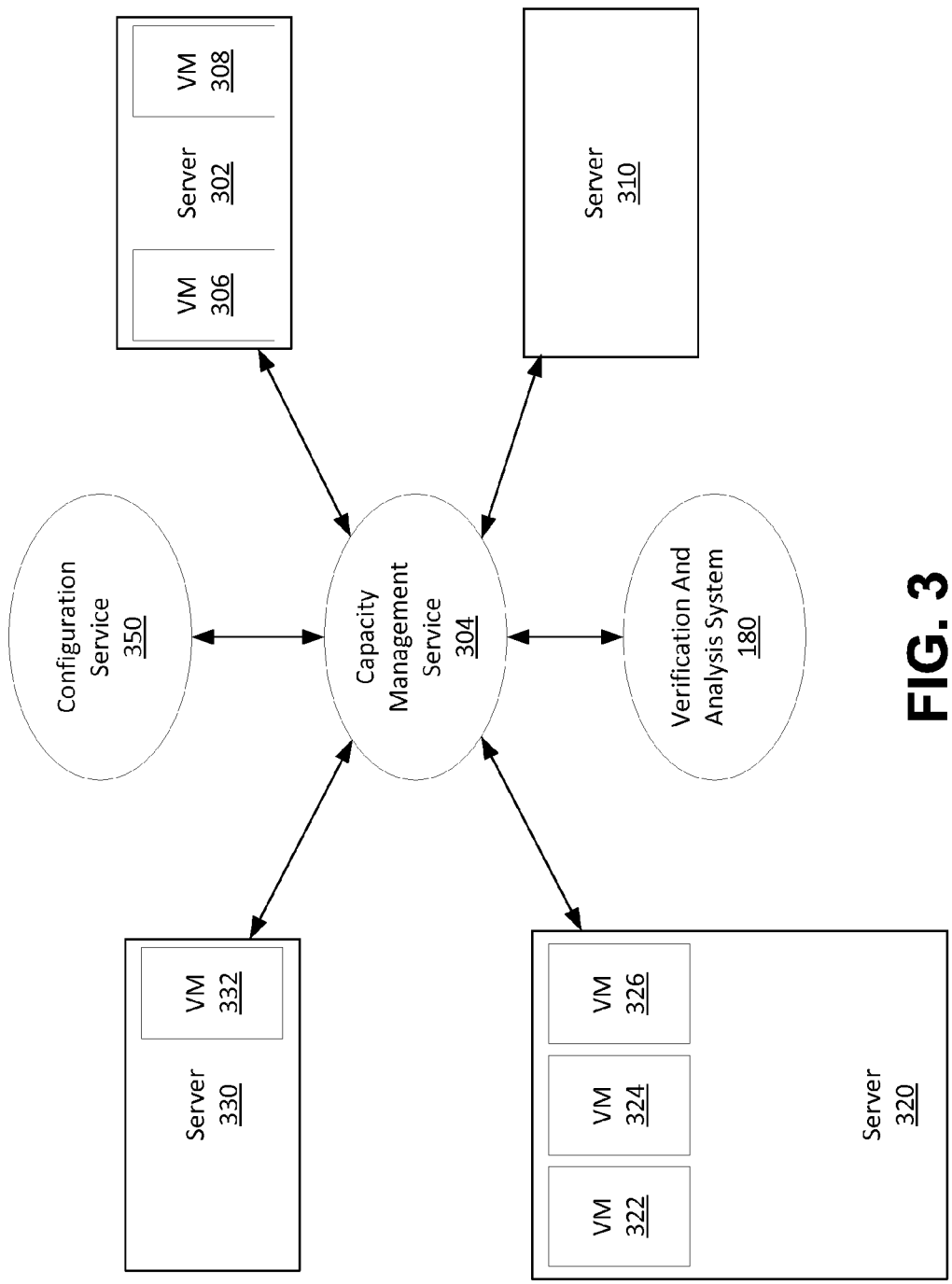
FIG. 3 is a diagram illustrating a mechanism for providing a verification and analysis system in accordance with the present disclosure.

FIG. 3 illustrates an example computing environment in which the embodiments described herein may be implemented. Referring to the figure, server computers 302, 310, 320 and 330 may communicate with a capacity management service 304 to provide configuration information. Server computer 302 may host virtual machine instances 306 and 308. Server computer 310 may not host any virtual machine instances; server computer 320 may host virtual machine instances 322, 324 and 326; and server computer 330 may host virtual machine instance 332.

A user may send a request for a verification task to verification and analysis system 180 via server 310. Verification and analysis system 180 may interact with capacity management service 304 to request resources for the task. Capacity management service 304 may interact with configuration service 350 to identify requirements for configuring an available server computer that can support the requested verification task. For example, requirements may include device hardware and any software or firmware that needs to be installed, or execution of a test to verify that a virtual computing instance of a particular type can function with updated computing configuration. The information may also indicate when evaluation tasks can be performed. For example, the information may include an evaluation schedule that minimizes potential disruptions to existing services being provided to customers.

Many computing environments such as data centers are large and complex and can include a vast number of interconnected devices. Technologies such as virtualization can increase the complexity. Computing environments thus may include a mix of various types of data flowing through both virtual and physical components. Computing devices such as servers and routers may have complex interactions, and behaviors in one area can affect the performance of the entire computing environment. Changes in the computing environment should therefore be analyzed and tested not only in its local environment but in conjunction with other devices in the computing environment to ensure that the computing environment on the whole provides an expected level of performance. Furthermore, the tests should be repeatable and relevant to metrics or benchmarks of interest. Metrics or benchmarks may include performance metrics that indicate how the computing environment performs under load. Performance metrics are useful for capacity planning and ensuring customer satisfaction. Such performance metrics may include throughput, latency and frame loss.

As the number of computing devices in a computing environment increases, the scope of potential parameters, test interfaces and performance metrics may increase dramatically. This makes it extremely difficult for test administrators and planners to analyze the configurations and parameters to identify a set of tests that can verify changes and satisfy applicable performance metrics.

Various aspects of the disclosure are now described with regard to certain examples and embodiments, which are intended to illustrate but not to limit the disclosure. Determinism, wherein program execution has a repeatable and well-defined sequence of cause and effect, can provide a predictable model for developers. Increasingly, hardware and service providers have relaxed requirements for determinism for the sake of efficiency by providing features such as multi-core processors and distributed services. These features may permit developers to build scalable applications but may also introduce data races and other sources of program errors. Many programming languages provide synchronization primitives or other techniques for rationally handling non-deterministic program conditions. These techniques may require advanced development skills or be costly to retrofit to an existing program.

In various embodiments disclosed herein, a computing environment such as data center 210 of FIG. 2 may implement a framework such as verification and analysis system 180 of FIG. 1. Verification and analysis system 180 may implement a deterministic container model that can be used to simplify the detection and handling of non-deterministic conditions in distributed services. In one embodiment, an application can be divided into a plurality of execution spaces. Each execution space may operate independently on a portion of the application. The execution spaces can be referred to herein as containers. Relationships between the containers may be defined by the container model and can enforce determinism constraints between containers.

Figure 4:
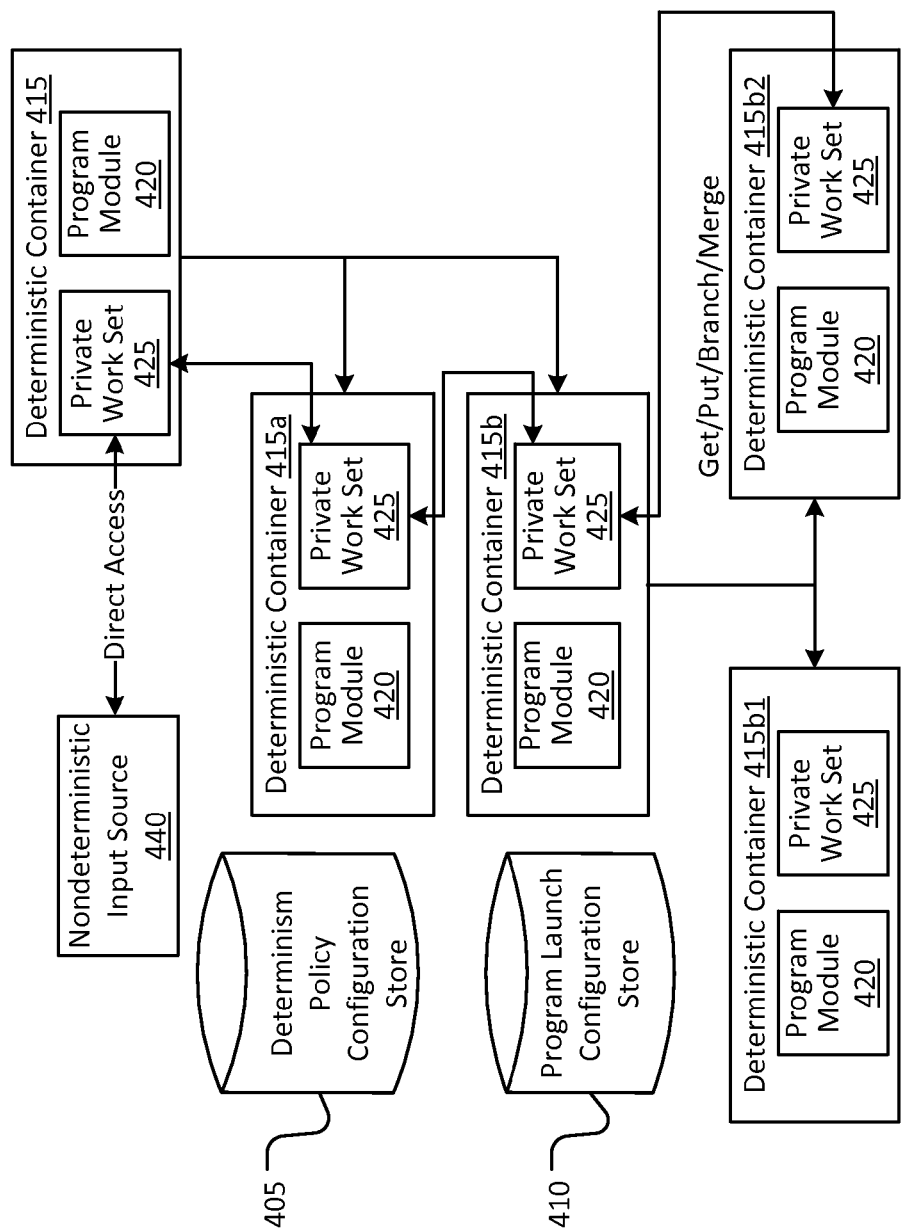
FIG. 4 is a diagram illustrating a mechanism for providing enforced determinism in accordance with the present disclosure.

FIG. 4 illustrates an example architecture for a mechanism for enforcing determinism. Referring to FIG. 4, a mechanism for enforcing determinism may include a determinism policy configuration store 405 storing thereon one or more policy elements describing a program determinism policy. In one embodiment, a policy element may describe the boundaries for which determinism is desired. For example, a policy element may indicate deterministic boundaries between threads, processes, applications, or other defined units of execution. A policy element may also describe groupings of identifiable execution units that override general deterministic boundaries. For example, a first policy element may specify a deterministic boundary between processes. A second policy element may specify that a logging process and an auditing process may reside within the same container.

In some embodiments, a policy element may describe access permissions for nondeterministic input sources. For example, a policy element may grant or deny permission to access an input source. The request to access an input source may be sent from one or more containers. A container may access nondeterministic input sources by sending requests through other containers. A policy element may describe ordering or access constraints for such requests.

In one embodiment, a policy element may describe responses to determinism violations as may be described in the same or other policy elements. For example, when a violation of a determinism policy is detected, a policy element may specify that the container should be deleted or otherwise destroyed or that the container should be attached to a debugger. In some embodiments, a policy element may specify a causal ordering policy in response to a violation of a determinism policy. Such an ordering policy may describe a fixed order of resolution for nondeterministic events, allowing determinism to be effectuated without interrupting program execution. For example, an ordering policy may provide a repeatable order for performing read and write operations so that executing the program repeatedly with the same inputs always provides the same outputs.

In other embodiments, a policy element may specify that execution of a program should be halted in some cases because an ordering policy may not resolve race conditions depending on the particular set of inputs. For example, an ordering policy may not be suitable for secure processing or other sensitive operations that may rely on specific determinism guarantees.

Referring again to FIG. 4, a mechanism for enforcing determinism may include a program launch configuration store 410 storing thereon one or more launch configurations describing the program environment. A program launch configuration may, for example, include information for creating or provisioning resources needed to run a thread, process, application or other unit of execution specified by policy to have a determinism boundary. For example, a program launch configuration may specify how to create a virtual machine to run an application, describe file system resources used by the application or provide similar instructions for resource provisioning.

A mechanism for enforcing determinism may also include deterministic containers 415, 415a, 415b, 415b1 and 415b2 (which may be referred herein singularly as "a container 415" or in the plural as "the containers 415") configured to enforce determinism boundaries. It will be appreciated that some embodiments may involve additional containers. In one embodiment, containers 415 may be arranged as an acyclic directed graph of container relationships. The acyclic graph may be defined, for example, by the creation of program units through operating system functions, such as "fork" or "exec," or through hypervisor functions such as launching new applications or services. These functions may be hooked, trapped or virtualized in the operating environment so as to cause the creation of deterministic containers rather than continuing to execute their usual functions. For example, a first container may be created as a root or entry point container. As new processes are initiated, a decision can be made as to whether the new process should be included in the current container or whether a new container should be created. The policy elements can be used to make this determination. A container may comprise one virtual machine or multiple virtual machines.

The containers 415 may include program modules 420 configured to control program execution within respective containers. The program module may be based at least in part on launch configuration information from program launch configuration store 410.

Containers 415 may include private work sets 425 controlling ephemeral program storage. The private work sets 425 may include memories, file systems, or other isolated storage areas accessible by the program module. The contents of private work sets 425 may be identified by a private identifier space specified by program modules 420, such as process identifiers, memory addresses, or file names that are decoupled from similarly named entities created by other program modules. The initial contents of one of the private work sets 425 may be based at least in part on others of the private work sets 425 owned by the container's parent according to the acyclic graph by branching the contents of the parent work set. For example, in FIG. 4 container 415 may be the parent for containers 415*a* and 415*b*. Container 415*b* may be the parent for containers 415*b*1 and 415*b*2. The parent and child containers may exchange updates to their private work sets through PUT and GET operations on named entities. When a child container is destroyed, the parent may inspect and incorporate portions of the remaining data by merging the contents of the child's work set. It can be appreciated that containers 415 may include software, hardware, or a combination thereof.

Policy elements may determine whether changes in private work sets can be viewed by other containers. If a container has been demonstrated to be safe (i.e., there are no non-deterministic behaviors, or all non-deterministic behaviors have been addressed), then a privilege log may indicate that the container is allowed to interact with other containers. In one embodiment, containers may only communicate between directly spawned containers (i.e., between parent and children containers.

Containers 415 may be configured to directly access one or more nondeterministic input sources 440, such as external web services, databases, or storage services as specified by determinism policies. Such direct access links may permit the containers 415 to copy data between a nondeterministic input source 440 and private work sets 425.

Containers 415 may include additional mediation functions to enforce determinism policies.

Containers 415 may log modifications to the private work sets 425. Containers 415 may include policies to trigger log replication or the exchange of updates to their private work sets. For example, containers 415 may include a policy to flush the log when it reaches a determined size. As another example, containers 415 may include a policy to flush the log based on the age of the oldest log entry. Containers 415 may checkpoint the log to batch together modifications to the private work sets or may permit exchanging updates in a different order than logged. Containers 415 may send invalidation notifications to their parent and/or child containers to maintain partial coherency in response to changes to the private work sets 425.

Containers 415 may be configured to trap GET/PUT operations between a parent container and child container and delay, reorder, or otherwise mutate the operation requests to enforce determinism or to apply ordering policies. Containers 415 may be configured to check for determinism violations when a GET/PUT occurs. For example, container 415 may verify that there are no non-deterministic orderings of reads and writes, such as race conditions, through GET/PUT operations. Containers 415 may apply determinism policies, such as terminating the container or applying a fixed ordering, when a determinism violation is detected.

Containers 415 may be configured to trap file system requests, network requests or other attempts to access data outside the private work set by the program module. Containers 415 may marshal the trapped requests to a suitable container to complete the operation. For example, a container 415 may be configured to follow the acyclic graph to locate the nearest ancestor container permitted to access the requested nondeterministic resource. Container 415 may marshal the request to the ancestor container for execution. The ancestor container may incorporate the results of the request into its private work set and perform GET/PUT operations to propagate the results to descendent containers along the acyclic graph until they reach the original container.

When a non-deterministic behavior occurs, the behavior can be logged. Additionally and optionally, the behavior can cause the program to be aborted and a debugger can be launched. Alternatively, an artificial ordering can be imposed and recorded.

Various aspects of the disclosure are now described with regard to examples and embodiments for constraint verification. Application verification is one process for determining that an implementation accurately reflects the conceptual specification of an application developer. Rigorous verification, such as examining many or all code paths of the application as opposed to running select test cases may be feasible for simple, deterministic applications. When the number of code paths is manageable, code paths may be enumerated for testing against a constraint specification. Distributed applications that may exhibit non-determinism and distributed message passing may create numerous variant code paths that can grow exponentially in terms of the number of program statements. Traditional analysis may thus be infeasible to complete in a reasonable amount of time and within reasonable cost constraints.

The present disclosure describes various embodiments for performing constraint analysis by using a virtualized version of a distributed application. In one embodiment, ordinary application message passing may be encapsulated with an envelope format that includes the application data as well as condition variables for program analysis. Redundantly derived message exchanges may be collapsed into a single exchange with combinations of the condition variables. In some embodiments, portions of the distributed application may be instanced to perform analyses in parallel.

Figure 5:
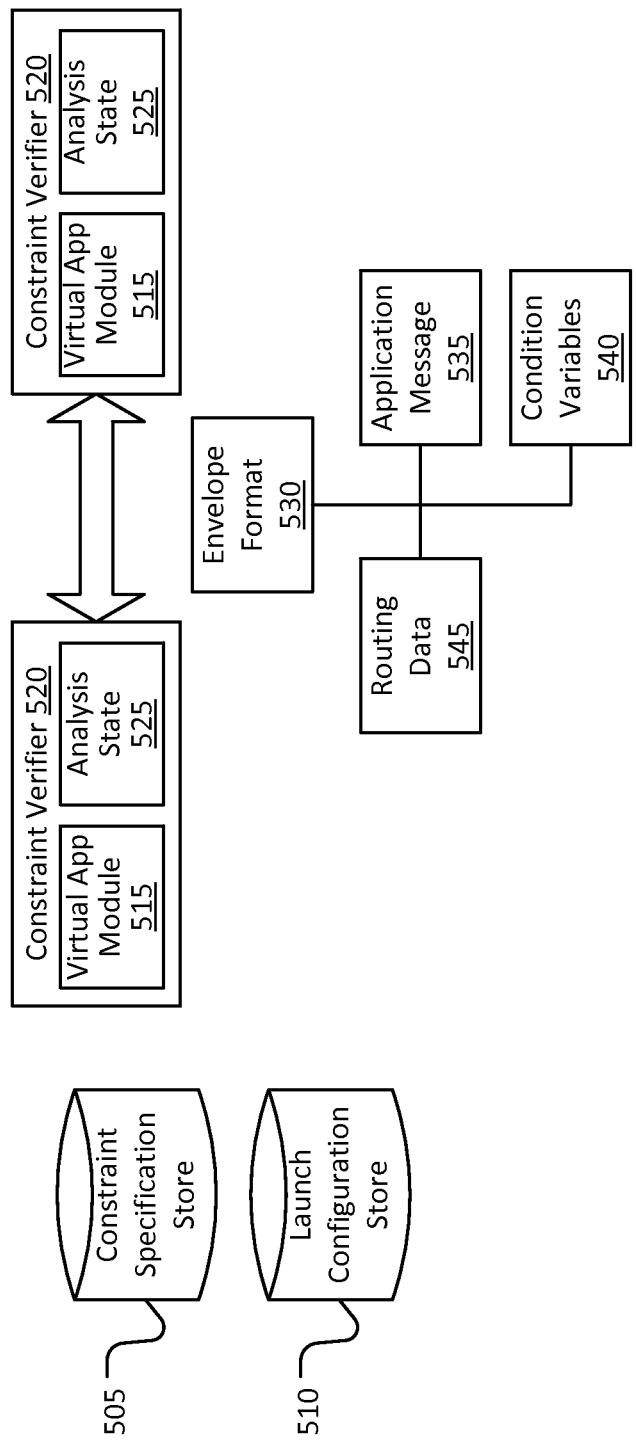
FIG. 5 is a diagram illustrating a mechanism for providing constraint verification in accordance with the present disclosure.

FIG. 5 illustrates an example architecture for a mechanism for implementing constraint verification for a nondeterministic distributed application. Referring to FIG. 5, a mechanism for implementing constraint verification may include a constraint specification store 505 storing thereon one or more constraints for program conditions that have been asserted as true. For example, some program conditions may be asserted by the application developer as true. In some embodiments a constraint may be specified as an invariant that the developer asserts is maintained at particular program locations. In other embodiments, a constraint may be specified as a set of preconditions or post-conditions associated with the sending of an application request or response that is asserted as true.

Referring again to FIG. 5, a launch configuration store 510 may store thereon a plurality of application modules and at least one virtual environment specification for executing the application modules. An application module, such as virtual application modules 515 in FIG. 5, may comprise source code, binary executables, scripts or other data operable to exercise the application. A virtual environment specification may include descriptions of how to create or provision private copies of resources, such as virtual machines, storage spaces, databases or other computing resources used by the application modules.

Constraint verifiers 520 may be configured to perform symbolic analysis or logical analysis of an application module running inside a virtual environment. Constraint verifiers 520 may include storage for analysis states 525 derived during the analysis. Analysis states 525 may be consulted when exchanging application messages between constraint verifiers 520.

An envelope format 530 may be used to support the exchange of verification messages between constraint verifiers 520. The envelope format 530 may include one or more application messages 535 produced by virtual application modules 515 and one or more condition variables 540 describing a portion of the analysis states 525 related to the application messages 535. The envelope format 530 may include additional metadata such as routing data 545 for directing the delivery of a plurality of application messages 535 in a batch to different portions of the application. In some embodiments the envelope format 530 may support externalized entity references. For example, the same application message may be sent multiple times under different program conditions. The envelope format 530 may replace the repeated application message with an identifier operable to allow constraint verifier 520 to retrieve the original application message.

In one embodiment, constraint verifiers 520 may access launch configuration store 510 and instantiate a plurality of virtualized application modules 515. Constraint verifiers 520 may use launch configuration information from launch configuration store 510 to provision private copies of virtual machines, storage spaces or other resources needed to execute virtualized application modules 515. Constraint verifiers 520 may initialize an analysis engine running either inside the virtual environment or acting as a hypervisor for the virtual environment with one or more constraints from constraint specification store 505.

Constraint verifiers 520 may be configured to analyze the program until a branch or other multivariate condition is reached. Constraint verifiers 520 may create condition variables 540 to augment analysis states 525 at the branch point. Condition variables 540 may include, for example, logical expressions of program variables. For example, for an IF-THEN-ELSE branch, constraint verifiers 520 may create a Boolean condition variable whose value reflects whether program execution takes the THEN branch or the ELSE branch. As additional examples, constraint verifiers 520 may create condition variables 540 whose value reflects the choice in a switch statement, the completion of a loop iterator or the nondeterministic acquisition of a lock.

In one illustrative embodiment, a first one of constraint verifiers 520 may transmit an application message 535 encapsulated in an envelope format 530 to a second one of constraint verifiers 520. The second constraint verifier may be verifying, for example, a virtual application module 515 operable to process application message 535. The envelope format 530 may include application message 535 and logical expressions representing program variables and condition variables 540. One of the constraint verifiers 520 may batch multiple application messages 535 into one encapsulated message or replace at least a portion of application message 535 with entity references to reduce the size of the transmitted messages.

The second constraint verifier may analyze the program until it is ready to transmit a second application message to the first constraint verifier. The second constraint verifier may aggregate multiple code paths leading to a second application message. For example, if a first code path with condition variable A leads to sending an application message and a second code path with condition variable B leads to sending the same application message, the second constraint verifier may send the application message once with a combined condition based on the predicate {A or B}. The second constraint verifier may simplify or reduce logical expressions representing program variables and condition variables for the second application message as may be inferred from the combined condition. For example, the second constraint verifier may reduce expressions involving condition variable A and integer program variable X where {A and X<=3} and {A and X=4} lead to sending the same application message to a single application message where {A and X<=4}. The second constraint verifier may include routing data in the envelope format indicating the plurality of application messages for which the second application message serves as a response.

The second constraint verifier may relax logical expressions to promote simplification or reduction. For example, the second constraint verifier may reduce expressions involving condition variable A and integer program variable X where {X<=3} and {A and X=4} to a single application message where {X<=4}. The second constraint verifier may increase tolerance for relaxation in response to the size of analysis state 525 or the number of pending exchanges between constraint verifiers 520.

Subsequent to receiving the second application message, the first constraint verifier may complete verification of the program. The first constraint verifier may use the simplified or reduced expressions from the second application message to coalesce multiple code paths arising from nondeterministic execution of the program or nondeterministic application message processing. The first constraint verifier may update its analysis state to cancel outstanding requests covered by the second application message.

Constraint verifiers 520 may perform at least a portion of the analyses in parallel. For example, a first one of the constraint verifiers 520 and a second one of the constraint verifiers 520 may perform their respective analyses in parallel in separate virtual environments. As another example, multiple copies of a virtual application module may be instantiated and analyzed in parallel. The multiple copies may perform periodic synchronization of their analysis states to eliminate duplicate code paths or application messages generated in common between the constraint verifiers. The synchronization may replicate the outstanding requests of each of the constraint verifiers so that either copy may process responses to the requests.

Upon completion of the analysis, an output may be provided that indicates (e.g., TRUE or FALSE) whether the property of interest has been verified. The analysis may be performed more than once in order to achieve a desired or predetermined level of confidence in the results. If the property of interest could not be verified, then counterexamples can be provided to demonstrate conditions which violate the property of interest.

Various aspects of the disclosure are now described with regard to examples and embodiments applicable to fuzz testing. Fuzzing or fuzz testing is a software testing methodology in which random input data is used to test a computer application. Fuzzing may be used to identify unexpected or exceptional conditions. Security fuzzing is the process of subjecting a program to various input permutations for the purpose of detecting security vulnerabilities. Traditional fuzzing approaches use blackbox fuzzing—randomly mutating an initial program input to generate additional test inputs and running the program with the additional inputs. In whitebox fuzzing, the initial program inputs are mutated by symbolically evaluating portions of the program to identify unexecuted code paths. Symbolic evaluation can be a time consuming part of the fuzzing process, thus constraining the number of test cases that may be considered. In particular, distributed message passing and nondeterministic program execution may create enormous numbers of program code flow variations that limit the utility of whitebox fuzzing under such conditions.

The present disclosure describes various embodiments for pruning the number of program code flow variations created by non-determinism and message passing through the use of virtualized program execution. In one embodiment, a program under analysis may be divided into multiple program execution units or containers. Each program execution unit may be executed inside a virtual environment which permits adjustment of the program's non-deterministic behaviors. Symbolic evaluation of the execution units may be performed to generate test inputs for the program. Redundant or non-productive portions of the input space may be pruned by collapsing messaging interactions between the program execution units and dynamically adjusting the determinism of program execution.

Figure 6:
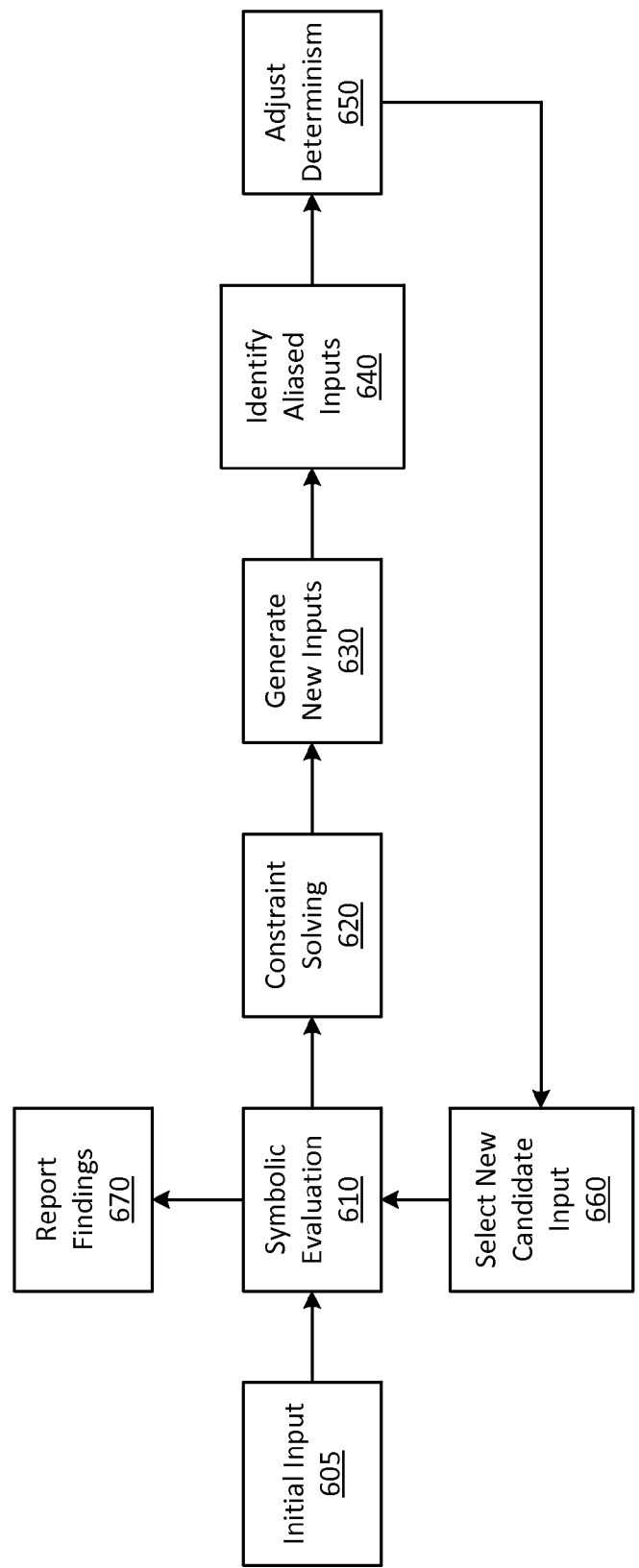
FIG. 6 is a flowchart depicting an example procedure for providing whitebox fuzzing in accordance with the present disclosure.

FIG. 6 illustrates an example mechanism for implementing whitebox fuzzing for a distributed application. A fuzzer subsystem may be implemented in one or more computing devices and may comprise software, hardware or a combination thereof. In one embodiment, a distributed application comprising a plurality of program execution units may be provided to a fuzzer subsystem along with an initial input 605 to seed the fuzzing search. A program execution unit may include source code, binary executable files, scripts or other program code operable to execute the distributed application. A program execution unit may include a launch configuration configured to launch virtual environment instances operable to execute the program execution unit.

Referring to FIG. 6, the fuzzer subsystem may perform symbolic evaluation 610 of at least some of the program execution units to gather constraints for reaching unexecuted portions of the program. For example, the fuzzer subsystem may construct a constraint specification specifying expected program execution constraints and symbolically evaluate a program execution unit to detect conditions under which the constraint specification may be violated. Program execution constraints may include constraints on the possible range of values for a variable, constraints to always execute or to never execute a particular portion of the program, constraints to send a particularly formatted message and the like. The fuzzer subsystem may collect additional constraints for program execution based at least in part on the violated specification.

The fuzzer subsystem may create a plurality of expressions negating the additional constraints. The fuzzer subsystem may select a plurality of subsets of a set of the additional constraints. For each selected subset, the fuzzer subsystem may construct an expression wherein the additional constraints included in the subset are satisfied and the additional constraints not included in the subset are not satisfied. The constructed expression may incorporate at least part of an expression corresponding to the constraint specification for the initial input.

In one embodiment, the fuzzer subsystem may create a search tree of program inputs by constraint solving 620 the plurality of expressions. The fuzzer subsystem may solve each constructed expression to generate new program inputs 630 whose execution is expected to satisfy the subsets of additional constraints.

The fuzzer subsystem may identify at least a portion of search tree nodes whose behavior is identical up to the order of execution. For example, the fuzzer subsystem may execute at least some of the program execution units in a virtualized environment to identify inputs whose behavior is identical up to a nondeterministic race condition. The fuzzer subsystem may execute the program execution units with one of the inputs, detect a collection of nondeterministic access operations during the execution, apply a hash function to the detected collection and compare the hash result to the hash results of the other inputs to identify aliased inputs 640.

The fuzzer subsystem may adjust program determinism 650 to replace the portion of search tree nodes with a single source tree node with a fixed order of execution. The fuzzer subsystem may construct a determinism policy for the virtualized environment that enforces a particular desired order of execution based at least in part on the collected nondeterministic access operations.

The fuzzer subsystem may recursively analyze the single source tree node and select new candidate inputs 660. The fuzzer subsystem may continue to construct the constraint specification corresponding to the program input for the single source tree node and symbolically evaluate at least some of the program execution units to gather constraints for reaching unexecuted portions of the program. If the fuzzer subsystem determines that the unexecuted portions of the program have been reached, or that the program has been tested to a predetermined threshold, then testing can be completed and the findings reported 670.

In some embodiments, the test environment may maintain a database of information for tracking data related to the execution and analysis activities and use search algorithms to identify a set of test inputs for fulfilling the objectives of the test. As the complexity of the testing environment and the complexity of a program increases, the search space of possible test inputs can grow exponentially. In some cases, it may be difficult or impossible to identify a finite number of test conditions within a reasonable time and cost constraints that can completely verify a program. In some embodiments, the search space may be analyzed to identify a candidate set of test inputs that satisfies a set of criteria or constraints. In one embodiment, the candidate set of inputs may comprise a subset of possible test inputs that satisfy the criteria or constraints in accordance with a fitness function.

In some embodiments, one or more metrics or benchmarks for evaluating the fitness of a test input can be identified. Verification and analysis system 180 can be used to generate test inputs to optimize the level and scope of verification within a set of constraints. Once a set of test inputs has been generated, verification and analysis system 180 may cause the automatic execution of the test and analysis activities on one or more computing devices in the test environment. In an embodiment, the computing devices may be selected by mapping samples of the search space to available computing resources and running tests on the computing resources. Additionally, the results of an initial set of tests can provide feedback to verification and analysis system 180 and can be used to determine a new set of test conditions to further optimize the test inputs.

As discussed above, a fitness function can be used to determine a set of test inputs. Any one of various fitness functions that can determine the closeness of a candidate solution to an objective can be used. A genetic function is one example of a heuristic search function that can be used for search and optimization of the test inputs.

In one embodiment, candidates can be selected based on biasing to influence the selection. For example, the data in the sample space can be weighted to indicate relevance of the parameters to one or more metrics, thus resulting in an increased likelihood of optimizing around the selected metrics.

In various embodiments, verification and analysis system 180 may employ probabilistic methods to guide and narrow the selection of test inputs. In order to provide test results that more thoroughly cover the potential flows through a program, the most relevant test inputs should be selected. However, the complexity of distributed computing environments with hundreds or thousands of networked devices may preclude a deterministic or exhaustive solution. In some embodiments a heuristic model can be used to find satisfactory solutions that provide an acceptable confidence level in the results. For example, experience-based techniques such as expert modeling can be used to aid initial selection of inputs. The heuristic model can probabilistically indicate parameters of likely impact through, for example, tagging various metadata related to a particular metric. Feedback from an initial round of tests can be used to further refine the initial selection, thus implementing a closed loop system that generates high impact tests in situations where programmatic or rigorous approaches may be impractical or infeasible. As an example, Markov modeling or variations thereof (e.g., hidden Markov model and hierarchical hidden Markov model) can be used in some embodiments to identify solutions that may otherwise be missed using traditional methods. Monte Carlo methods, finite element analysis and computational fluid analysis can also be used to generate results in various embodiments.

In many computing environments the amount of resources available for testing may be limited at any given time. For example, in a typical data center the majority of resources may continuously be in use in order to provide services for customers. In some embodiments, verification and analysis system 180 may interact with a fleet management system. For example, referring to FIG. 3, verification and analysis system 180 may interact with a capacity management service 304 to identify spare or otherwise usable computing resources for hosting virtual machines for analysis and testing. Additionally, the inputs selected for testing and analysis can be based on availability of spare resources and the configuration of the spare resources. For example, the available test resources may include configurations that deviate from a desired test configuration. The variances in the configurations of test resources from the desired test configurations may be considered in generating a best available solution and update the test inputs.

In some embodiments, verification and analysis system 180 may interact with a configuration service 350 that may be implemented in the computing environment and configured to manage configurations. Configuration service 350 may create and manage workflows and map configurations to computing devices in the computing environment. The configuration management system can be part of a test workflow for verifying performance and operation of various configurations.

Verification and analysis system 180 may interact with configuration service 350 and map desired configurations to available configurations in the computing environment. The available test resources may be evaluated to determine the particular configurations that are implemented on the test resources. The configurations that need to be changed to conform to the desired test configurations may be evaluated to determine the scope of required changes and the cost associated with updating the test resources. The cost associated with updating the test resources may be balanced against the value of implementing the exact desired configurations to determine if the configurations should be implemented. Verification and analysis system 180 may thus incorporate a cost evaluation mechanism that uses cost thresholds to determine if available configurations are sufficiently close to the desired configurations and if the costs associated with updating the configurations will provide results of sufficient value. The information from the cost evaluation mechanism may be provided as additional input to the search algorithms to identify an optimized set of test inputs that considers cost thresholds. In one embodiment, verification and analysis system 180 may interact with configuration service 350 to determine available test resources and integrate information regarding available configurations and costs associated with the available configurations to achieving a desired population state and determine and adjust the next set of tests.

By interacting with a fleet management infrastructure that may include configuration management service 330 and other fleet management subsystems, verification and analysis system 180 can determine costs associated with loss of revenue when candidate test resources are pulled from production. The cost of removing a particular candidate resource from production can be determined based on current market conditions for the services provided by the resource. This cost can be compared to the value of testing the particular set of conditions to determine if the benefit of testing exceeds the cost of pulling the resource. For example, a current cost per minute of pulling a resource and the expected time to conduct a set of tests may be determined. If the current cost per minute falls below a predetermined level, the verification and analysis system can occupy the resource and conduct the tests.

Figure 7:
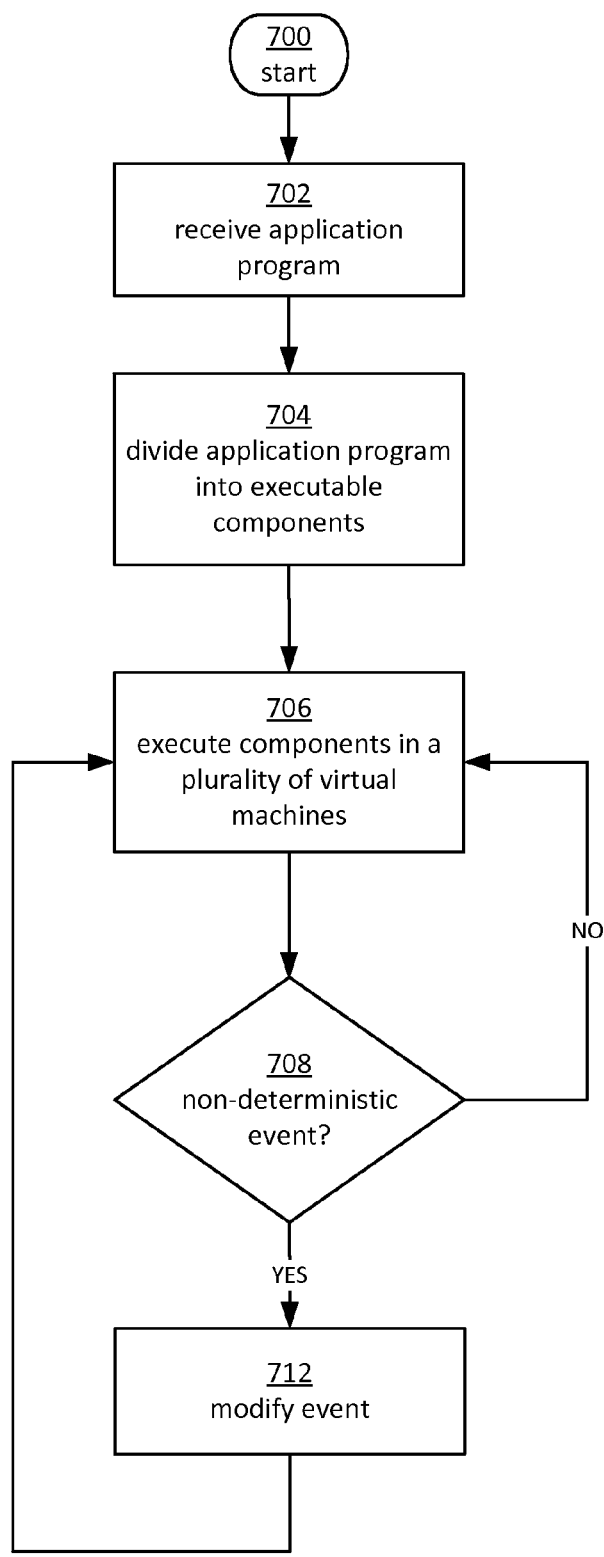
FIG. 7 is a flowchart depicting an example procedure for providing a verification and analysis system in accordance with the present disclosure.

FIG. 7 illustrates an example operational procedure for executing distributed application programs. In an embodiment, a verification and analysis system can correspond to verification and analysis system 180 in FIG. 1.

Referring to FIG. 7, operation 700 begins the operational procedure. Operation 700 may be followed by operation 702. Operation 702 illustrates that an application program for execution in a distributed computing environment is received.

Operation 702 may be followed by operation 704. Operation 704 illustrates that the application program is divided into a plurality of independently executable components. In some embodiments, the dividing may be performed on in accordance with one or more determinism policies. Additionally, the executable components may be separately executable as independent processes.

Operation 704 may be followed by operation 706. Operation 706 illustrates executing the components in a plurality of virtual machines. In some embodiment, the virtual machines are configured to independently execute one of the components. The components may be executed using one or more shared states. Additionally, relationships between the components may be defined by one or more determinism policies.

Operation 706 may be followed by operation 708. If a non-deterministic event has not occurred between at least two of the virtual machines in accordance one or more determinism policies, then operation 708 may be followed by operation 706.

If a non-deterministic event has occurred between at least two of the virtual machines in accordance one or more determinism policies, then operation 708 may be followed by operation 710. Operation 710 illustrates modifying the non-deterministic event in order to effectuate a deterministic result. Operation 710 may be followed by operation 706.

Figure 8:
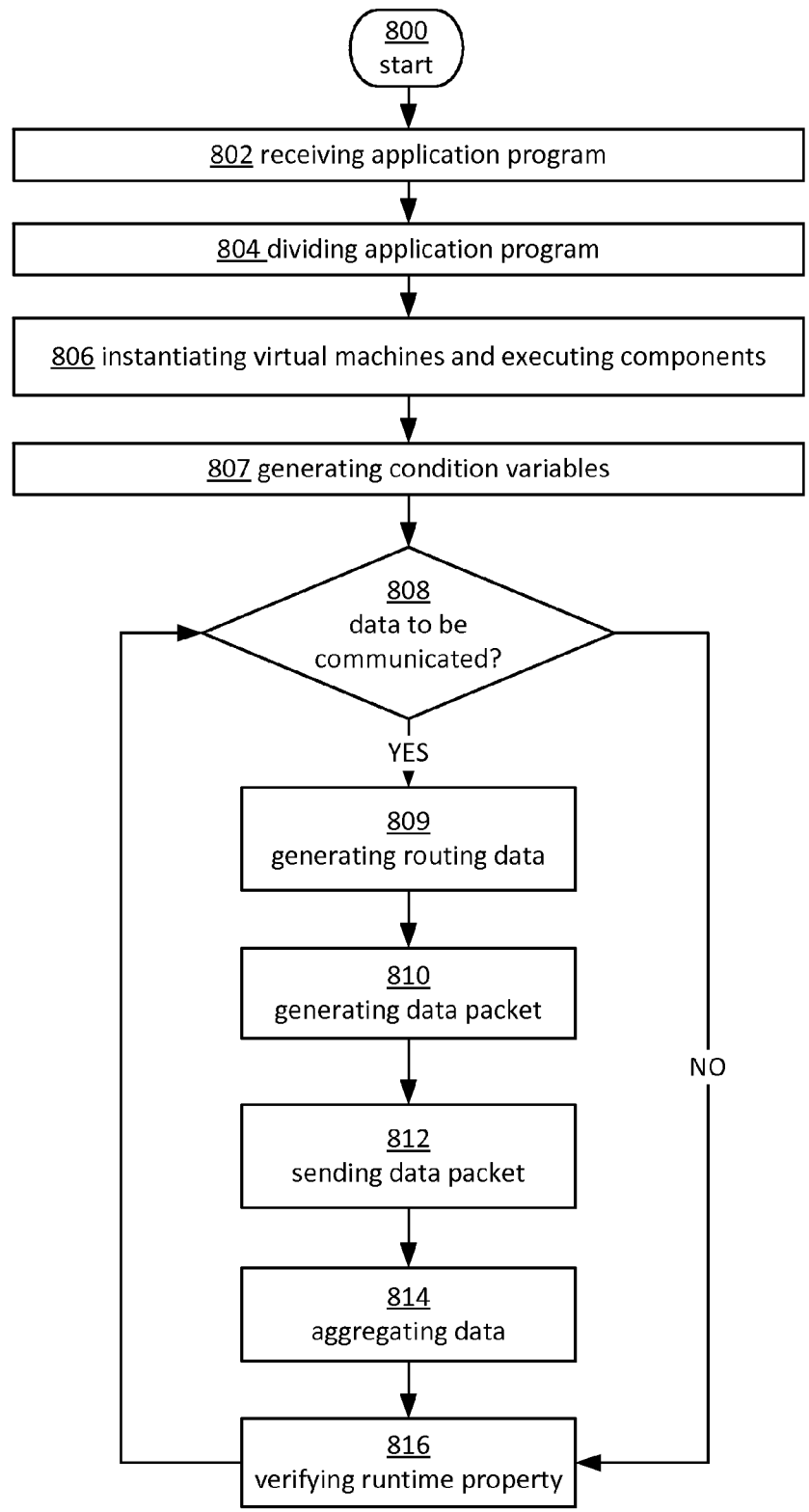
FIG. 8 is a flowchart depicting an example procedure for providing a verification and analysis system in accordance with the present disclosure.

FIG. 8 illustrates an example operational procedure for verifying a property of a distributed application program using a verification and analysis system. In an embodiment, a verification and analysis system can correspond to verification and analysis system 180 in FIG. 1.

Referring to FIG. 8, operation 800 begins the operational procedure. Operation 800 may be followed by operation 802. Operation 802 illustrates receiving an application program for execution in a distributed computing environment. Operation 802 may be followed by operation 804. Operation 804 illustrates dividing the software application into a plurality of components. In one embodiment, the software application may be divided in accordance with one or more constraints. Furthermore, the components may be executable as independent processes.

Operation 804 may be followed by operation 806. Operation 806 illustrates instantiating a plurality of virtual machines and executing the plurality of independently executable components in the plurality of virtual machines. Operation 806 may be followed by operation 807. Operation 807 illustrates generating condition variables based on execution of the components.

Operation 807 may be followed by operation 808. Operation 808 illustrates determining that application program data is to be communicated between at least two of the components. If application data is to be communicated between at least two of the components, then operation 808 may be followed by operation 809. Operation 809 illustrates generating routing information for the application program data.

Operation 809 may be followed by operation 810. Operation 810 illustrates generating a data packet that encapsulates the application program data. In one embodiment, the data packet may include associated condition variables and data path information.

Operation 810 may be followed by operation 812. Operation 812 illustrates sending the data packet to a destination virtual machine for the data packet. Operation 812 may be followed by operation 814. Operation 814 illustrates aggregating application program data from multiple communication events and combining respective condition variable and data path information.

Operation 814 may be followed by operation 816. Operation 816 illustrates verifying a runtime property of the application program by using the aggregated application program data to represent code execution paths of the application program. Operation 816 may be followed by operation 808.

If application data is not to be communicated between at least two of the components, then operation 808 may be followed by operation 816.

Figure 9:
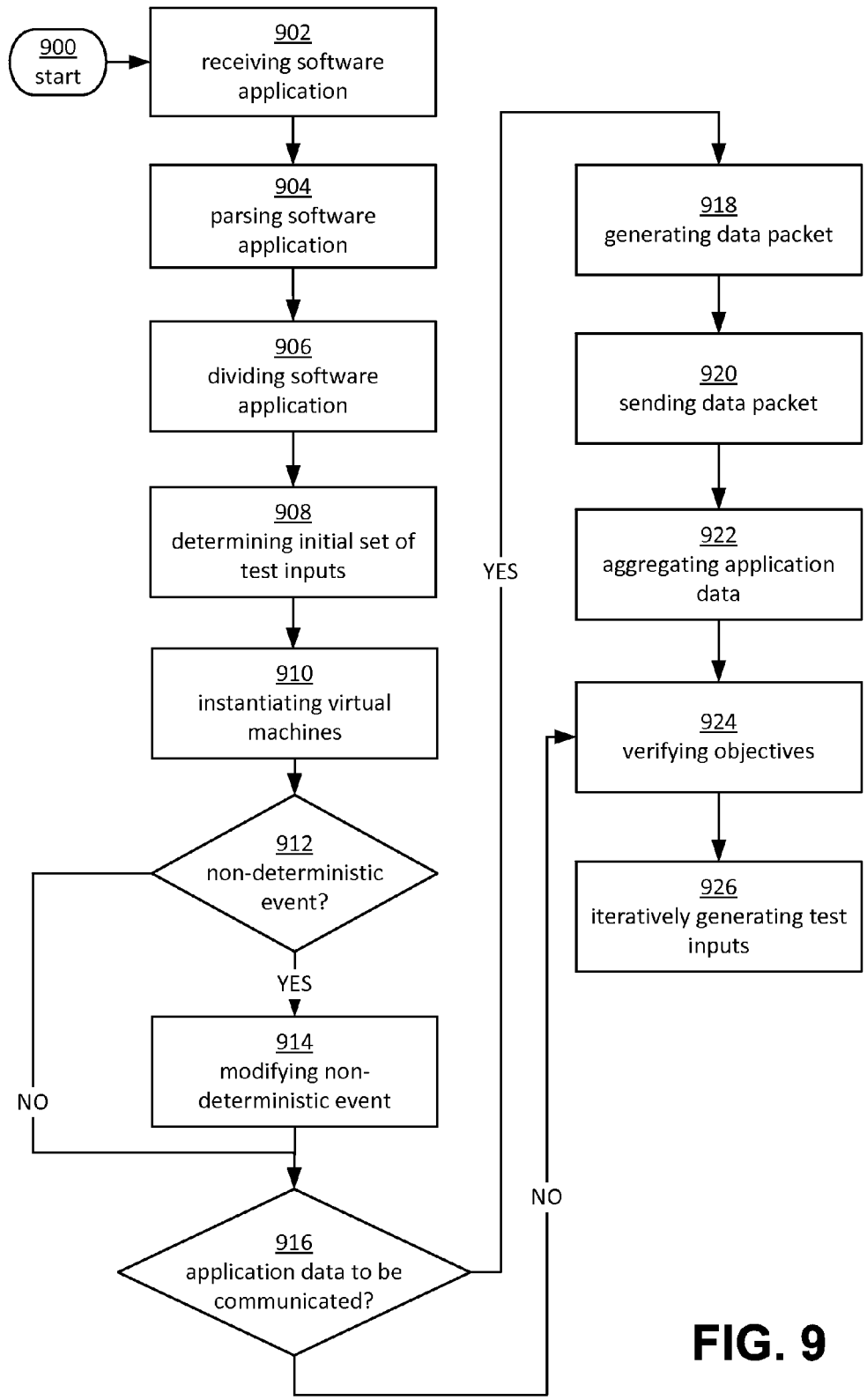
FIG. 9 is a flowchart depicting an example procedure for providing a verification and analysis system in accordance with the present disclosure.

FIG. 9 illustrates an example operational procedure for verifying a property of a distributed application program using a verification and analysis system. In an embodiment, a verification and analysis system can correspond to verification and analysis system 180 in FIG. 1.

Referring to FIG. 9, operation 900 begins the operational procedure. Operation 900 may be followed by operation 902. Operation 902 illustrates receiving an application program operable to execute in a distributed computing environment.

Operation 902 may be followed by operation 904. Operation 904 illustrates parsing the application program. In an embodiment, the parsing can be performed in accordance with one or more verification constraints. Operation 904 may be followed by operation 906. Operation 906 illustrates dividing the application program into a plurality of independently executable components. In an embodiment, the components may be executable as independent processes.

Operation 906 may be followed by operation 908. Operation 908 illustrates determining an initial set of test inputs to the independently executable components. Operation 908 may be followed by operation 910. Operation 910 illustrates instantiating a plurality of virtual machines and executing the independently executable components in respective ones of the virtual machines.

Operation 910 may be followed by operation 912. Operation 912 illustrates determining that a non-deterministic event has occurred between at least two of the virtual machines. If a non-deterministic event has occurred between at least two of the virtual machines, the operation 912 may be followed by operation 914. Operation 914 illustrates modifying a non-deterministic event in order to effectuate a deterministic result in accordance with one or more determinism policies. If a non-deterministic event has not occurred between at least two of the virtual machines, the operation 912 may be followed by operation 916.

Operation 916 illustrates determining that application data is to be communicated between at least two of the virtual machines. If application data is to be communicated between at least two of the virtual machines, then operation 916 may be followed by operation 918. Operation 918 illustrates generating a data packet that encapsulates the application data along with associated condition variables and routing information. Operation 918 may be followed by operation 920. Operation 920 illustrates sending the data packet to a destination for the data packet. Operation 920 may be followed by operation 922. Operation 922 illustrates aggregating application data and combining respective condition variable and data path information. Operation 922 may be followed by operation 924.

If application data is not to be communicated between at least two of the virtual machines, then operation 916 may be followed by operation 924.

Operation 924 illustrates verifying the one or more verification objectives by using aggregated data packets to represent code execution paths. Operation 924 may be followed by operation 926. Operation 926 illustrates iteratively generating new test inputs based on the verifying until the one or more verification objectives are validated.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising one or more computing nodes and one or more data stores in communication with the one or more computing nodes, the one or more data stores having stored thereon:
   policy information comprising one or more determinism policies indicative of non-deterministic program conditions, responses to determinism violations, and criteria for dividing program code; and
   computer instructions that, upon execution by the one or more computing nodes, at least cause the computing system to:
      receive an application program operable for execution in a distributed computing environment comprising one or more computing devices;
      divide the application program into executable components in accordance with the criteria for dividing program code, the executable components being separately executable as independent processes;
      execute the executable components in a plurality of containers configured to instantiate an execution space for executing the executable components, wherein the containers are configured to independently execute the executable components using one or more shared states and wherein relationships between the executable components are defined by the one or more determinism policies; and
      in response to a determination that a non-deterministic event has occurred between at least two of the plurality of containers in accordance with the one or more determinism policies, applying one or more responses to the non-deterministic event in accordance with the one or more determinism policies in order to effectuate a deterministic result, wherein the one or more responses comprise terminating one of the plurality of containers.

2. The computing system according to claim 1, wherein the one or more data stores further store thereon one or more launch configurations describing a program environment.

3. The computing system according to claim 1, wherein the determination that a non-deterministic event has occurred is performed in part by trapping operations between the containers and synchronizing the shared states, and wherein the non-deterministic event is modified by delaying or reordering.

4. The computing system according to claim 1, wherein the determination that a non-deterministic event has occurred is performed in part by trapping file system requests or network requests.

5. The computing system according to claim 1, wherein the one or more determinism policies indicate deterministic boundaries between threads, processes, or applications.

6. A computer-implemented method for executing distributed application programs, the method comprising:

dividing an application program into a plurality of components that are independently executable in accordance with determinism boundaries for which determinism is enforced, the application program being operable to execute in a distributed computing environment;

independently executing the plurality of components in a plurality of containers configured to instantiate an execution space for executing the plurality of components to enforce the determinism boundaries, and replacing non-deterministic events between two or more of the plurality of containers with deterministic events in accordance with a predetermined set of responses to the non-deterministic events, wherein one of the plurality of containers is terminated in association with the predetermined set of responses.

7. The method of claim 6 wherein the application program is divided in accordance with criteria for dividing program code during executing of the application program.

8. The method of claim 6, wherein the plurality of containers are implemented in a plurality of virtual machines, wherein the plurality of virtual machines are configured to independently execute the plurality of components and wherein relationships between the plurality of components are defined by one or more determinism policies.

9. The method of claim 6, wherein said replacing is in response to a determination that a non-deterministic event has occurred in accordance with one or more determinism policies.

10. The method of claim 6, wherein the plurality of components are arranged as an acyclic directed graph of executable component relationships.

11. The method of claim 6, wherein said replacing is performed by one or more mediation functions configured to enforce the predetermined set of responses.

12. The method of claim 6, wherein the replacing comprises applying a fixed ordering.

13. The method of claim 12, wherein the fixed ordering comprises a repeatable order for performing memory reads and writes.

14. The method of claim 6, wherein the responses include groupings of identifiable execution units that override deterministic boundaries.

15. The method of claim 6, wherein the responses include access permissions for nondeterministic input sources.

16. The method of claim 6, further comprising invoking a debugger in response to a non-deterministic event.

17. The method of claim 6, wherein said dividing is performed based on configuration information describing the distributed computing environment.

18. The method of claim 17, wherein the configuration information is indicative of resources for executing a thread, process, application, or other unit of execution identified as having a determinism boundary.

19. One or more non-transitory computer-readable storage media having collectively stored thereon executable instructions that, when executed by one or more processors of a computer system, cause the computer system to:

cause separate execution of a plurality of independently executable components in a plurality of containers in accordance with determinism boundaries for which determinism is enforced, wherein the plurality of independently executable components are derived from an application program operable to execute in a distributed computing environment, and wherein the plurality of containers are configured to instantiate an execution space for executing the independently executable components; and in response to a determination that a non-deterministic event has occurred between at least two of the plurality of containers in accordance with non-deterministic program conditions defined by one or more determinism policies, replace the non-deterministic event with a deterministic event in accordance with the one or more determinism policies, wherein one of the plurality of containers is terminated in association with the one or more determinism policies.

20. The one or more non-transitory computer-readable storage media of claim 19, wherein the plurality of independently executable components are arranged as an acyclic directed graph indicative of relationships between the plurality of independently executable components.

21. The one or more non-transitory computer-readable storage media of claim 19 wherein the plurality of independently executable components comprise a mediation function to enforce the one or more determinism policies.

22. The one or more non-transitory computer-readable storage media of claim 19 wherein the determination is based on trapping operations between the plurality of containers.

23. The one or more non-transitory computer-readable storage media of claim 22 wherein the trapped operations are completed in a designated container.

24. A computing system comprising one or more computing nodes and one or more data stores in communication with the one or more computing nodes, the one or more data stores having stored thereon computer instructions that, upon execution by the one or more computing nodes, at least cause the computing system to:

divide an application program into a plurality of components that are independently executable in accordance with determinism boundaries for which determinism is enforced, the application program being operable to execute in a distributed computing environment;

independently execute the plurality of components in a plurality of containers configured to instantiate an execution space for executing the plurality of components; and replace non-deterministic events between the plurality of containers with deterministic events in accordance with a predetermined set of responses to the non-deterministic events, wherein one of the plurality of containers is terminated in association with the predetermined set of responses.

25. The computing system of claim 24, wherein the application program is divided in accordance with criteria for dividing program code during executing of the application program.

26. The computing system of claim 24, wherein the plurality of components are arranged as an acyclic directed graph of executable component relationships.

27. The computing system of claim 24, wherein the non-deterministic events are replaced at least in part by applying a fixed ordering.

* * * * *